United States Patent
Wu

(10) Patent No.: US 7,557,949 B2
(45) Date of Patent: Jul. 7, 2009

(54) INKJET PRINT CONTROL APPARATUS

(75) Inventor: Heng-Chien Wu, Taipei (TW)

(73) Assignee: Sunplus Technology Co., Ltd. (TW)

( * ) Notice: Subject to any disclaimer, the term of this patent is extended or adjusted under 35 U.S.C. 154(b) by 1052 days.

(21) Appl. No.: 11/115,264

(22) Filed: Apr. 27, 2005

(65) Prior Publication Data

US 2006/0082819 A1    Apr. 20, 2006

(30) Foreign Application Priority Data

Oct. 18, 2004    (TW) .............................. 93131514 A

(51) Int. Cl.
*H04N 1/21* (2006.01)
*H04N 1/034* (2006.01)
*G06F 3/12* (2006.01)
*G06F 13/28* (2006.01)

(52) U.S. Cl. .................... 358/1.16; 358/1.8; 710/23; 710/26; 347/5

(58) Field of Classification Search ............ 358/1.8, 358/1.16, 1.17, 502, 524, 444, 296; 347/5, 347/12, 13; 710/22, 23, 26

See application file for complete search history.

(56) References Cited

U.S. PATENT DOCUMENTS

| | | | | | |
|---|---|---|---|---|---|
| 4,825,389 | A | * | 4/1989 | Masaki ....................... 358/1.8 |
| 5,579,453 | A | * | 11/1996 | Lindenfelser et al. ....... 358/1.16 |
| 5,588,092 | A | * | 12/1996 | Komiya et al. .............. 358/1.8 |
| 7,126,715 | B2 | * | 10/2006 | Nakayama et al. ......... 358/1.16 |
| 7,306,307 | B2 | * | 12/2007 | Lapstun et al. .............. 347/5 |
| 2001/0003199 | A1 | * | 6/2001 | Maruyama et al. ......... 358/1.16 |

* cited by examiner

*Primary Examiner*—Scott A Rogers
(74) *Attorney, Agent, or Firm*—Bacon & Thomas, PLLC

(57) ABSTRACT

An inkjet print control apparatus connected with a processor and a memory through a bus. The memory stores print image data. The inkjet print control apparatus fetches the print image data stored in the memory for further data operation in order to drive one or more inkjet heads. The inkjet print control apparatus includes a DMA controller, an instruction RAM and a capture processor. The instruction RAM stores a capture instruction for the print image data fetched. The capture processor is connected to the instruction RAM and the DMA controller for computing an address accessed by the DMA controller to the memory according to the capture instruction. The DMA controller accesses the print image data according to the address.

13 Claims, 9 Drawing Sheets

|  | Byte-a | Byte-b | Byte-c | Byte-d |
|---|---|---|---|---|
| Address-0 | Pixel-0, Pixel-1 | Pixel-2, Pixel-3 | Pixel-4, Pixel-5 | Pixel-6, Pixel-7 |
| Address-1 | Pixel-8, Pixel-9 | Pixel-10, Pixel-11 | Pixel-12, Pixel-13 | Pixel-14, Pixel-15 |
| ... | | | | |
| Address-n | | | | |

FIG. 1 (PRIOR ART)

line offset record instruction: | loop | forward | next line offset number | looping control instruction: | loop | command address pointer | repeat number |

FIG. 3

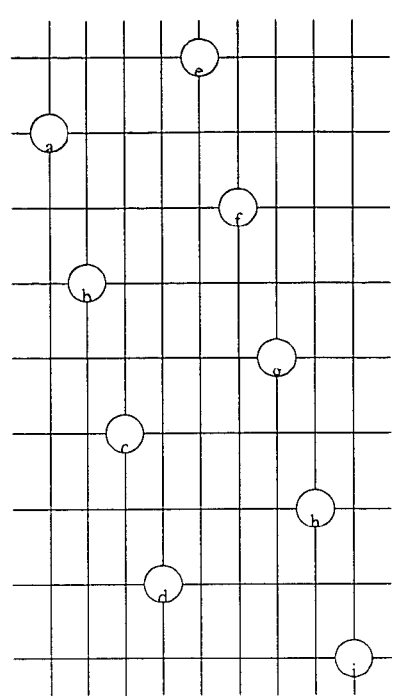 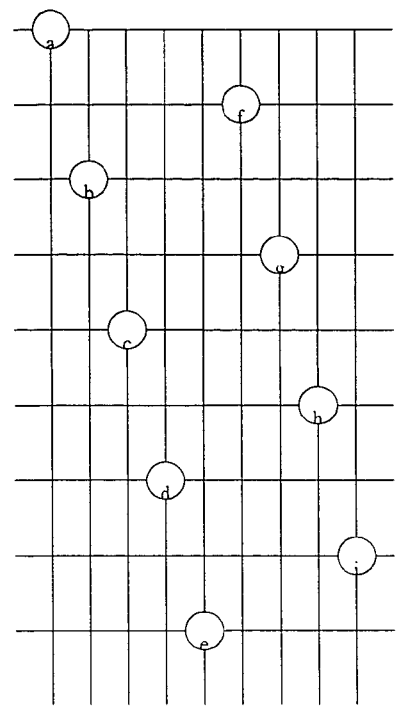
D0                    D1
FIG. 5
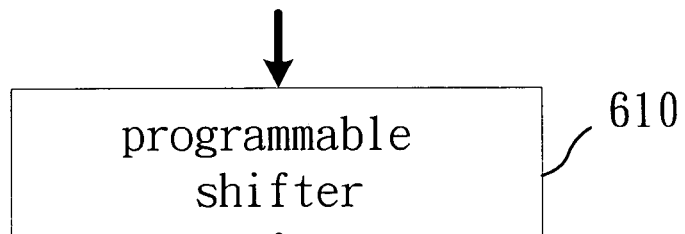
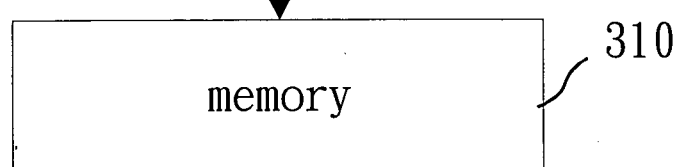
FIG. 6

| | | | | | | |
|---|---|---|---|---|---|---|
| K0.0 | K0.1 | K0.2 | | K0.31 | | K0.n |
| K1.0 | K1.1 | K1.2 | | K1.31 | | K1.n |
| C0.0 | C0.1 | C0.2 | | C0.31 | | C0.n | 1'st scan line, a, Dc1 Data
| C1.0 | C1.1 | C1.2 | | C1.31 | | C1.n |
| M0.0 | M0.1 | M0.2 | | M0.31 | | M0.n | 1'st scan line, a, Dm1 Data
| M1.0 | M1.1 | M1.2 | | M1.31 | | M1.n |
| Y0.0 | Y0.1 | Y0.2 | | Y0.31 | | Y0.n | 1'st scan line, a, Dy1 Data
| Y1.0 | Y1.1 | Y1.2 | | Y1.31 | | Y1.n |
| K0.0 | K0.1 | K0.2 | | K0.31 | | K0.n |
| K1.0 | K1.1 | K1.2 | | K1.31 | | K1.n |
| C0.0 | C0.1 | C0.2 | | C0.31 | | C0.n | 2'nd scan line, e, Dc0 Data
| C1.0 | C1.1 | C1.2 | | C1.31 | | C1.n |
| M0.0 | M0.1 | M0.2 | | M0.31 | | M0.n | 2'nd scan line, e, Dm0 Data
| M1.0 | M1.1 | M1.2 | | M1.31 | | M1.n |
| Y0.0 | Y0.1 | Y0.2 | | Y0.31 | | Y0.n | 2'nd scan line, e, Dy0 Data
| Y1.0 | Y1.1 | Y1.2 | | Y1.31 | | Y1.n |
| ... | ... | ... | | ... | | ... | ...
| C0.0 | C0.1 | C0.2 | | C0.31 | | C0.n | 4'th scan line, a, Dc0 Data
| C1.0 | C1.1 | C1.2 | | C1.31 | | C1.n |
| M0.0 | M0.1 | M0.2 | | M0.31 | | M0.n | 4'th scan line, a, Dm0 Data
| M1.0 | M1.1 | M1.2 | | M1.31 | | M1.n |
| Y0.0 | Y0.1 | Y0.2 | | Y0.31 | | Y0.n | 4'th scan line, a, Dy0 Data
| Y1.0 | Y1.1 | Y1.2 | | Y1.31 | | Y1.n |
| K0.0 | K0.1 | K0.2 | | K0.31 | | K0.n |
| K1.0 | K1.1 | K1.2 | | K1.31 | | K1.n |
| C0.0 | C0.1 | C0.2 | | C0.31 | | C0.n | 5'th scan line, b, Dc1 Data
| C1.0 | C1.1 | C1.2 | | C1.31 | | C1.n |
| M0.0 | M0.1 | M0.2 | | M0.31 | | M0.n | 5'th scan line, b, Dm1 Data
| M1.0 | M1.1 | M1.2 | | M1.31 | | M1.n |
| Y0.0 | Y0.1 | Y0.2 | | Y0.31 | | Y0.n | 5'th scan line, b, Dy1 Data
| Y1.0 | Y1.1 | Y1.2 | | Y1.31 | | Y1.n |

FIG. 7

| Bank/Addr | 0 | 1 | 2 | 31 | |
|---|---|---|---|---|---|
| Bank-0 | $C_1 1.0$ | $C_1 1.1$ | $C_1 1.2$ | $C_1 1.31$ | C Pass-1 1'st line, a, Dc1 |
| | $M_1 1.0$ | $M_1 1.1$ | $M_1 1.2$ | $M_1 1.31$ | M Pass-1 1'st line, a, Dm1 |
| (32-bit) | $Y_1 1.0$ | $Y_1 1.1$ | $Y_1 1.2$ | $Y_1 1.31$ | Y Pass-1 1'st line, a, Dy1 |
| | $C_1 4.0$ | $C_1 4.1$ | $C_1 4.2$ | $C_1 4.31$ | |
| | $M_1 4.0$ | $M_1 4.1$ | $M_1 4.2$ | $M_1 4.31$ | C Pass-1 4'th line, a, Dc0 |
| | $Y_1 4.0$ | $Y_1 4.1$ | $Y_1 4.2$ | $Y_1 4.31$ | |
| | $C_1 5.0$ | $C_1 5.1$ | $C_1 5.2$ | $C_1 5.31$ | |
| | $M_1 5.0$ | $M_1 5.1$ | $M_1 5.2$ | $M_1 5.31$ | C Pass-1 5'th line, b, Dc1 |
| | $Y_1 5.0$ | $Y_1 5.1$ | $Y_1 5.2$ | $Y_1 5.31$ | |
| | | | | | |
| | | | | | |
| | | | | | |
| | $C_1 3.0$ | $C_1 3.1$ | $C_1 3.2$ | $C_1 3.31$ | C Pass-1 3'rd line, f, Dc1 |
| | $M_1 3.0$ | $M_1 3.1$ | $M_1 3.2$ | $M_1 3.31$ | |
| Bank-1 | $Y_1 3.0$ | $Y_1 3.1$ | $Y_1 3.2$ | $Y_1 3.31$ | Y Pass-1 3'rd line, f, Dy1 |
| | | | | | |
| (32-bit) | | | | | |
| | $C_1 15.0$ | $C_1 15.1$ | $C_1 15.2$ | $C_1 15.31$ | C Pass-1 15'th line, i, Dc1 |
| | $M_1 15.0$ | $M_1 15.1$ | $M_1 15.2$ | $M_1 15.31$ | M Pass-1 15'th line, i, Dm1 |
| | $Y_1 15.0$ | $Y_1 15.1$ | $Y_1 15.2$ | $Y_1 15.31$ | Y Pass-1 15'th line, i, Dy1 |
| | $C_1 18.0$ | $C_1 18.1$ | $C_1 18.2$ | $C_1 18.31$ | C Pass-1 18'th line, i, Dc0 |
| | $M_1 18.0$ | $M_1 18.1$ | $M_1 18.2$ | $M_1 18.31$ | M Pass-1 18'th line, i, Dm0 |
| | $Y_1 18.0$ | $Y_1 18.1$ | $Y_1 18.2$ | $Y_1 18.31$ | Y Pass-1 18'th line, i, Dy0 |
| | | | | | Empty |
| Bank- ... | | | | | Empty |
| Bank-31 | | | | | Empty |
| | | | | | |

FIG. 10

INKJET PRINT CONTROL APPARATUS

BACKGROUND OF THE INVENTION

1. Field of the Invention

The invention relates to an inkjet print control apparatus and, more particularly, to an inkjet print control apparatus using a simple instruction to read non-successive print data.

2. Description of Related Art

Currently, inkjet printers capable of providing color printing are in wide spread use as multimedia is becoming popular rapidly. Because the inkjet printers can print multiple lines at a time, and to meet with the mechanical features of nozzle arrangement of inkjet head or other hardware features, print image data is not fetched line by line in up-down sequence but by regular or irregular branch. To achieve this, a processor in an inkjet printer or a personal computer (PC) connected to the inkjet printer requires performing pre-sequencing arrangement, which occupies processor time and bus bandwidth in the inkjet printer or the PC.

As shown in FIG. 1, a typical memory arrangement for image data is to store horizontally adjacent pixels in a memory. Every address of the memory has a word of four bytes. Namely, as a pixel has four bits, the adjacent pixels are stored in a next address after eight pixels occupy a word.

When a printer prints multiple lines at a time, it has to read non-successive addresses in the memory because print data is located in different lines. In addition, a pixel data of a word is used in each time. For an example of print data after halftone process, a pixel data only occupies one or few bits of memory space. For a memory width of 16 bits, each read from a 16-bit data can have only one available bit (a pixel data), since only one pixel data is required for a line. Accordingly, 16 times of read operations are required for completely reading the horizontal 16 pixels data, which wastes time and also occupies the common memory bandwidth to be used by other processors. Similarly, a longer memory width, such as 32 bits, may waster more time and bandwidth.

To overcome this, U.S. Pat. No. 6,298,332 applies programmable timing profile to adjust associated timing control of different inkjet heads. However, this cannot overcome the problem caused by printing multiple lines at a time, as the processor in the inkjet printer or the PC has to convert raw data of image into a format capable of meeting with the sequence of inkjet heads in advance. Such a conversion requires software operations including heavy bit operation and the operation speed is slow. When a specific processor is applied to the conversion, the performance is increased due to job division but the operation speed is still slow. Therefore, it is desirable to provide an improved device to mitigate and/or obviate the aforementioned problems.

SUMMARY OF THE INVENTION

The object of the invention is to provide an inkjet print control apparatus, which can use a simple instruction to read non-successive print data.

To achieve the object, an inkjet print control apparatus is provided. The inkjet print control apparatus is connected with a processor and a memory through a bus. The memory stores print image data. The inkjet print control apparatus fetches the print image data stored in the memory for further data operation in order to drive one or more inkjet heads. The inkjet print control apparatus includes a DMA controller, an instruction RAM and a capture processor. The DMA controller is connected to the bus for accessing the print image data stored in the memory. The instruction RAM stores a capture instruction for the print image data fetched. The capture processor is connected to the instruction RAM and the DMA controller for computing an address accessed by the DMA controller to the memory according to the capture instruction. Namely, the DMA controller accesses the print image data in the memory according to the address.

Other objects, advantages, and novel features of the invention will become more apparent from the following detailed description when taken in conjunction with the accompanying drawings.

BRIEF DESCRIPTION OF THE DRAWINGS

FIG. 1 is a schematic diagram of a typical memory arrangement for image data;

FIG. 3 is formats of capture instructions according to the invention;

FIG. 5 is a schematic view of nozzles of inkjet heads of an inkjet printer according to the invention;

FIG. 6 is a schematic diagram of offset arrangement of adjusting pixels smaller than memory width according to the invention;

FIG. 7 is a schematic diagram of an arrangement of image data in a memory according to the invention;

FIG. 10 is a schematic diagram of an arrangement of image data in a firing buffer according to the invention.

DETAILED DESCRIPTION OF THE PREFERRED EMBODIMENT

Figure 2:
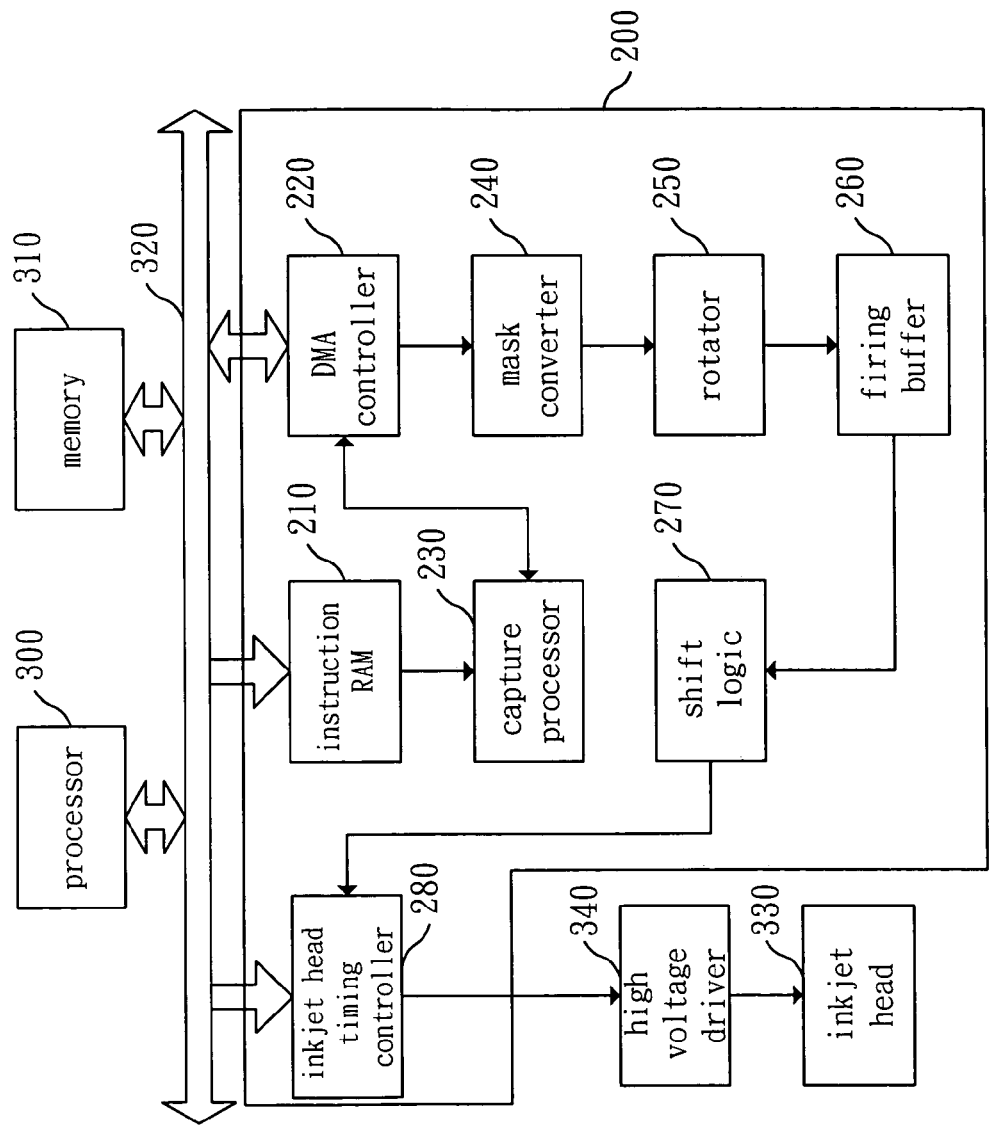
FIG. 2 is a block diagram of an inkjet print control apparatus according to the invention.

FIG. 2 is a block diagram of an inkjet print control apparatus 200 according to the invention. In FIG. 2, the device 200 consists of an instruction RAM 210, a DMA controller 220, a capture processor 230, a mask converter 240, a rotator 250, a firing buffer 260, a shift logic 270 and an inkjet head timing controller 280. The device 200 is connected with a processor 300 and a memory 310 through a bus 320 for fetching print image data stored in the memory 310 and performing data operations in order to drive one or more inkjet heads 330 by a high voltage driver 340.

The DMA controller 220 is connected to the bus 320 for accessing the print image data in the memory 310. The instruction RAM 210 is connected to the bus 320 for storing a capture instruction for the print image data fetched. The capture processor 230 is connected to the instruction RAM 210 and the DMA controller 220 for computing an access address accessed by the DMA controller 220 to the memory 310 according to the capture instruction. The DMA controller 220 accesses the print image data in the memory 310 according to the access address.

FIG. 3 shows formats of capture instructions stored in the instruction memory 210. As shown in FIG. 3, the capture instructions include a looping control instruction for looping fetch and a line offset record instruction for non-looping fetch. The line offset record instruction has fields of loop, forward and next line offset number. The looping control instruction has fields of loop, command address pointer and repeat number.

The parameters for the line offset record instruction and the looping control instruction can be adjusted by a system programmer according to nozzle positions of inkjet heads and written by the processor 300 to the instruction RAM 210. The execution sequence starts with position "0" in the instruction RAM 210, followed by sequential branch to an instruction at a next column address for execution.

When the loop field of an instruction is "0", it indicates the instruction as the line offset record instruction that provides an offset column number required for next column data to be read. The forward field as "0" indicates a following column number. In this case, required DMA address is obtained by multiplication (offset number multiplied by horizontal width) and addition (plus current DMA address). The forward field as "1" indicates a previous column number. In this case, the required DMA address is obtained by multiplication (offset number multiplied by horizontal width) and subtraction (current DMA address minus a result of the multiplication).

When the loop field is "1", it indicates the instruction as the looping control instruction that its command address pointer field indicates a next command address to be executed in the instruction memory 210. The repeat number field is a number of repeating current loop. When the repeat number is reached, an instruction of a next address in the instruction RAM 210 is executed until the content of the instruction is "0" to indicate that the reading of current vertical lines are over, and then it returns to the address "0" of the instruction RAM 210 for executing next loop. Such a way provides convenient computation to obtain all DMA addresses of current column in sequence.

Figure 4:
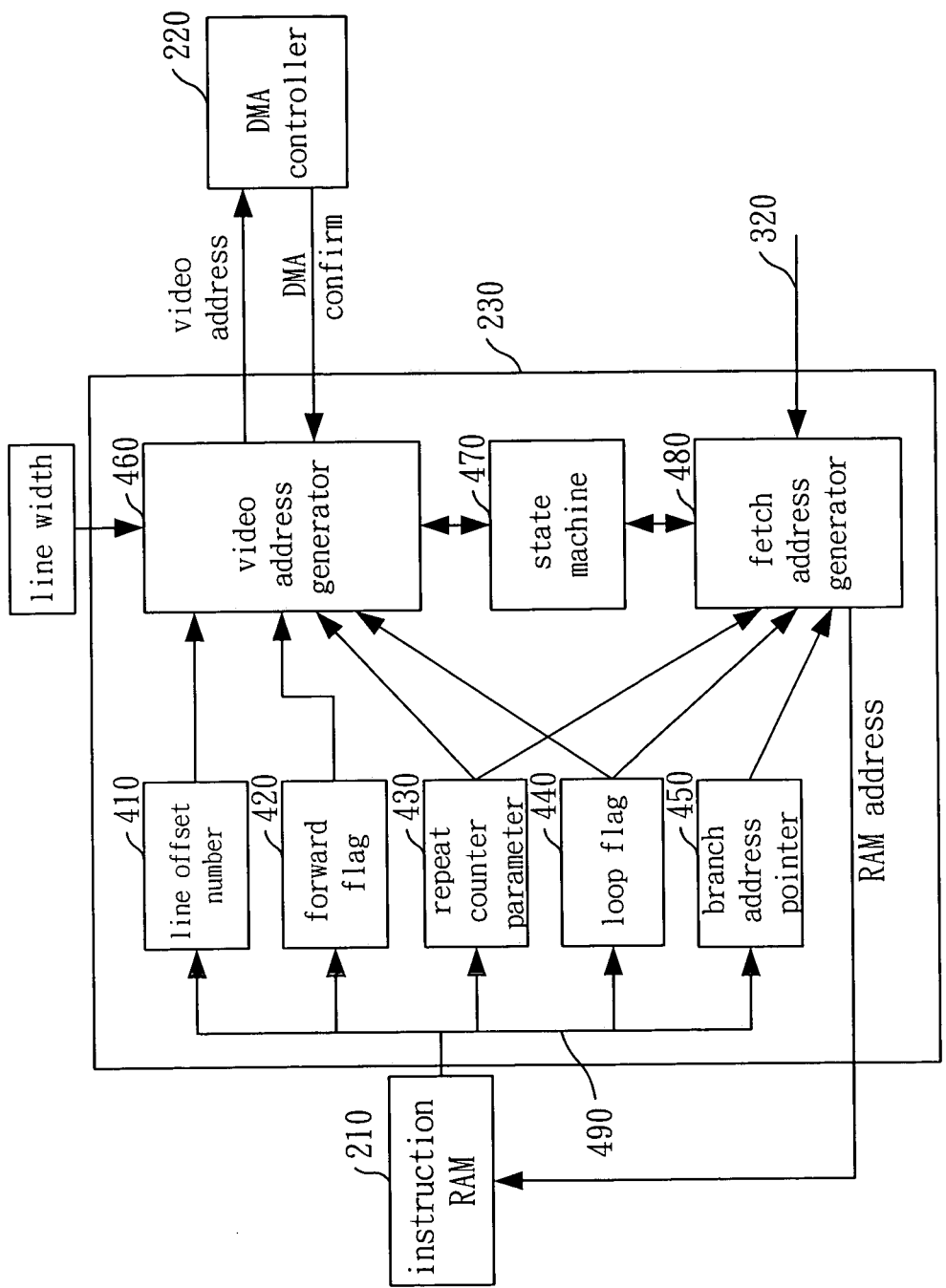
FIG. 4 is a block diagram of a capture processor according to the invention.

FIG. 4 is a block diagram of the capture processor 230. The capture processor 230 includes a line offset number 410, a forward flag 420, a repeat counter parameter 430, a loop flag 440, a branch address pointer 450, a video address generator 460, a state machine 470 and a fetch address generator 480. The capture processor 230 computes an address of the memory 310 according to instructions stored in the instruction RAM 210 for the DMA controller 220 to accordingly fetch the print image data. The instructions stored in the instruction RAM 210 are changed with the nozzle positions adjusted by a system programmer.

The instruction RAM 210 is connected with the capture processor 230 through a bus 490 to output data. All fields of the data output of the instruction RAM 210 are sent respectively to a line offset unit 410, a forward and backward flag 420, a repeat counter parameter unit 430, a loop flag 440 and a branch address unit 450. Therefore, the instruction RAM 210 can provide corresponding information of line offset, forward or backward offset, loop indication, repeat count and branch fetch address and associated controls.

The video address generator 460 generates appropriate video address according to the information provided by the instruction RAM 210 and timing provided by the state machine 470. The fetch address generator 480 generates appropriate instruction fetch address according to the information provided by the instruction RAM 210 and timing provided by the state machine 470 for fetching data (instructions) stored in the instruction RAM 210. When a capture instruction is a last data indication, the fetch address generator 480 is reset. Also, the video address generated by the video address generator 460 branches to a start address at next column.

The DMA controller 220 accesses the print image data stored in the memory 310 according to the video address, until an internal data counter counts down to zero to indicate that the column lines are printed completely.

FIG. 5 is a schematic view of nozzles of inkjet heads of an inkjet printer. As shown in FIG. 5, D0 and D1 represent even and odd line nozzles of a color respectively. The moving inkjet head horizontally ejects coloring to a current nozzle position. For an example of using 18 nozzles as nozzle number of a color, when the inkjet printer can print one or more colors, its inkjet head accordingly has one or more D0 and D1 nozzles. To obtain higher speed print, the number of a monochromatic nozzle can be up to several hundreds and above, and color nozzles can be placed on horizontally or vertically adjacent positions of the monochromatic nozzle.

For the D0 and D1 nozzles of all colors, the nozzles with the same English alphabet number can eject ink droplets concurrently, but their D0 and D1 horizontal positions have an offset according to the corresponding mechanical positions. The offset may not be an integer multiplier of the system memory bus width. To overcome this, addresses to be written of the memory are adjusted in the even or odd lines, i.e., increasing or reducing an offset of pixel by integer multiplier of the memory width, and as shown in FIG. 6, a programmable shifter 610 is used to adjust the offsets of pixels smaller than memory width. FIG. 7 shows horizontally adjusted and aligned image data format.

As shown in FIG. 7, unprocessed data of a raw image is placed in the memory 310, line by line and pixel by pixel. A line (print horizontal width) has a length containing "n+1" pixels with two bits per pixel, wherein "K0.0" and "K1.0" represent 0-th black pixel on the leftmost, "K0.1" and "K1.1" represent 1st black pixel next to the respective 0-th black pixel, . . . , "K0.n" and "K1.n" represent n-th black pixel on the rightmost. In this embodiment, due to two bits per pixel, low bits from "K0.0" to "K0.n" are placed one by one as a line, and high bits from "K1.0" to "K1.n" are placed on immediately next addresses to respective low bits in a same column. Similarly, "Cx.y" represents a high- or low-bit cyan pixel on y-th position, "Mx,y" represents a high- or low-bit magenta pixel on y-th position, and "Yx.y" represents a high- or low-bit yellow pixel on y-th position. If existing, other color pixels can be arranged in the same a way.

Taking the D0 and D1 nozzles of FIG. 5 as an example, data to be processed has C (cyan), M (magenta), Y (yellow) colors and the ink ejection can be arranged in a sequence of nozzle number a, b, c, . . . , h, i, which are not placed in order, as shown in FIG. 7. Accordingly, a simple instruction is used to control branch operation in order to fetch the data.

Thus, control instructions to meet with the nozzle arrangement are written in the instruction RAM 210. Next, parameters to meet with the inkjet head timing control are written in a register of the inkjet head timing controller 280. The DMA controller 220 is set to a start DMA address and started as raw data of print image is placed in the memory 310.

If the print data is not processed by shingling mask, mask address parameters of the mask converter 240 are set, or mask data is directly set. Print quality can be increased by multi-masking but each band requires a different mask. The parameters associated with masks can be set based on the following equation (1), and mask arrangement is added to equation (1) as referring to band number.

$$C_m 1.x = F(C0.x, C1.x, F(\text{Band-}m), F(\text{Mask-}m)), \tag{1}$$

where m indicates a band order to be added to equation (1) for computing a respective mask.

Figure 8:
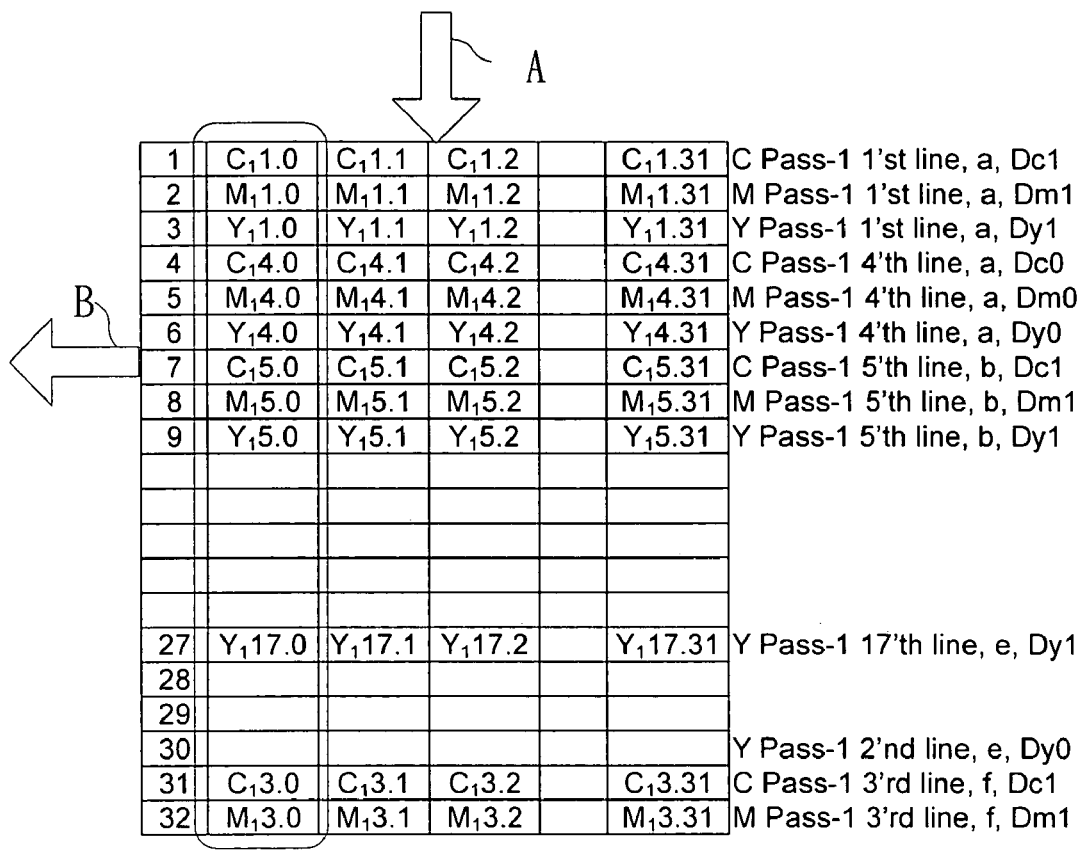
FIG. 8 is a schematic diagram of an arrangement of image data in a rotator according to the invention.
Figure 9:
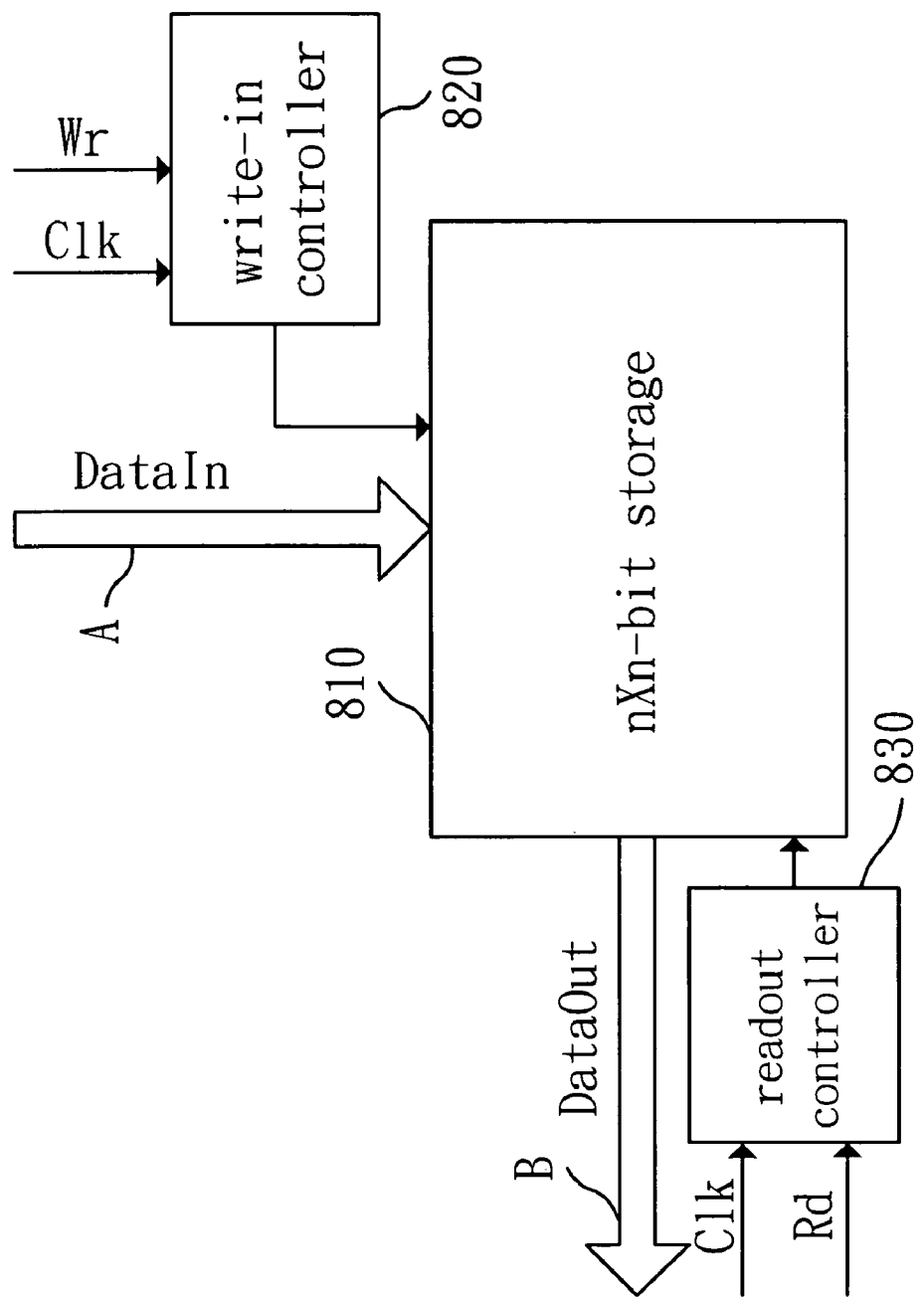
FIG. 9 is a block diagram of the rotator of FIG. 8 according to the invention.

The DMA controller 220 reads a same column data to be printed from the memory 310 at different locations according to the control of instructions in the instruction RAM 210 and applies equation (1) to convert the data into a form of one bit per pixel. Next, the data converted by the mask converter 240 is sent to the rotator 250, as shown in FIG. 8 that the data is written in the rotator 250 in the 'A' direction. FIG. 9 is a block diagram of the rotator 250. In FIG. 9, the rotator 250 consists of a 32×32-bit storage 810, a write-in controller 820 and a readout controller 830. The storage 810 can be a register or latch. The write-in controller 820 controls data to be written in the storage 810 in the 'A' direction. The readout controller 830 controls the data to be read in the B direction.

When the rotator 250 is filled with data, the data in the rotator 250 is read from rotated 90-degree direction, i.e., the 'B' direction shown in FIG. 8, and placed in the firing buffer 260. In this embodiment, the rotator 250 reads 32-bit data in the 'B' direction at a time and writes the 32-bit data sequentially in the firing buffer 260 at addresses 0 to 31 of bank (bank-0), and so on until all data in the rotator 250 is read and written in the firing buffer 260 completely. Next, after the rotator has been filled with the sequential data, the rotator 250 repeats the read operation and writes data in the firing buffer 260 at next bank (bank-1). Accordingly, such a read and write procedure is repeated until the whole column data is moved in the firing buffer 260.

Thus, the firing buffer 260 is stored with 32 column print data. As shown in FIG. 10, data in the firing buffer 260 is read, starting with the first column, i.e., bank-0 address-0, next to bank-1 address-0, next to bank-2 address-0, and finally to bank-31 address-0. Subsequently, data in the second column is read, i.e., starting with bank-0 address-1, next to bank-1 address-1, next to bank-2 address-1, and finally to bank-31 address-1. Such a read procedure is repeated until the last column data, i.e., address-31, is complete. At this point, 32 vertical line data in consistent with the height of inkjet head is sent horizontally to the inkjet head timing controller 280 through the shift logic 270 and then to a high voltage driver 340 to drive the inkjet head 330, thereby completing the print.

When the DMA controller 220 reads the last data in a print column from the memory 310, it indicates that the 32 column data is read completely and the address of the instruction memory 210 is returned to the start position "0" for next 32 print column data. The operation is repeated until the horizontal end, which completes printing of the last column data. Thus, successively horizontal lines equal to the print height of the inkjet head, i.e., 18 successively horizontal lines (D0+D1) shown in FIG. 5, are printed by head height covered column completely and horizontally. Accordingly, the entire frame is filled so as to complete full page print.

In view of the foregoing, it is known that the invention uses a simple instruction to properly branch to non-successive print image data for reading from the memory 310, and then uses hardware to store the data after rotation, thereby converting the data stored into a data arrangement format capable of meeting with the inkjet head print sequence. In addition, by means of flexible instruction, irregular branch reading operation can be processed, and a looping function is used to reduce instruction number for increasing nozzle number, thereby satisfying high-speed print requirement.

Although the present invention has been explained in relation to its preferred embodiment, it is to be understood that many other possible modifications and variations can be made without departing from the spirit and scope of the invention as hereinafter claimed.

What is claimed is:

1. An inkjet print control apparatus, which is connected with a processor and a memory through a bus, the memory storing print image data, the inkjet print control apparatus fetching the print image data stored in the memory for further data operation in order to drive one or more inkjet heads, the apparatus comprising:
   a DMA controller, which is connected to the bus for accessing the print image data stored in the memory;
   an instruction RAM, which stores a capture instruction for the print image data fetched;
   a capture processor, which is connected to the instruction RAM and the DMA controller for computing an address accessed by the DMA controller to the memory according to the capture instruction;
   wherein the DMA controller accesses the print image data stored in the memory according to the address.

2. The apparatus as claimed in claim 1, wherein the capture instruction is grouped into a looping fetch instruction and a non-looping fetch instruction.

3. The apparatus as claimed in claim 1, further comprising a mask converter, which is connected to the DMA controller for performing masking on the print image data fetched by the DMA controller.

4. The apparatus as claimed in claim 1, further comprising a rotator, which is connected to the mask converter for performing rotating on an output data by the mask converter.

5. The apparatus as claimed in claim 4, wherein the rotator comprises a n×n-bit storage, a write-in controller and a readout controller.

6. The apparatus as claimed in claim 5, wherein the write-in controller controls data to be written in the memory in a first direction, and the readout controller controls the data to be read in a second direction.

7. The apparatus as claimed in claim 6, wherein the first direction is mutually vertical to the second direction.

8. The apparatus as claimed in claim 5, wherein the n×n-bit storage consists of registers.

9. The apparatus as claimed in claim 5, wherein the n×n-bit storage consists of latches.

10. The apparatus as claimed in claim 4, further comprising a firing buffer, which is connected to the rotator for temporarily storing the output data of the firing buffer.

11. The apparatus as claimed in claim 10, further comprising a shift logic, which is connected to the firing buffer for converting a parallel output data of the firing buffer into a serial data for shifting output.

12. The apparatus as claimed in claim 11, further comprising an inkjet head timing controller, which is connected to the shift logic for producing an inkjet head timing control signal according to the serial data output by the shift logic and an inkjet head arrangement.

13. The apparatus as claimed in claim 12, further comprising a high-voltage driver, which is connected to the inkjet head timing controller for converting the inkjet head timing control signal into a voltage level to thus drive an inkjet head.

* * * * *